(12) United States Patent
Buechler et al.

(10) Patent No.: US 9,175,700 B2
(45) Date of Patent: Nov. 3, 2015

(54) METHOD AND APPARATUS FOR DETECTING THE POSITION OF A PISTON OF A PISTON CYLINDER THROUGH THE USE OF MICROWAVES

(75) Inventors: Josef Buechler, Pfaffenhofen (DE); Sorin Fericean, Leonberg (DE); Albert Dorneich, Ostfildern (DE); Markus Fritton, Neuhausen (DE)

(73) Assignee: BALLUFF GmbH, Neuhausen (DE)

( * ) Notice: Subject to any disclaimer, the term of this patent is extended or adjusted under 35 U.S.C. 154(b) by 683 days.

(21) Appl. No.: 13/535,579

(22) Filed: Jun. 28, 2012

(65) Prior Publication Data

US 2012/0316828 A1   Dec. 13, 2012

Related U.S. Application Data

(63) Continuation of application No. PCT/EP2010/070603, filed on Dec. 22, 2010.

(30) Foreign Application Priority Data

Dec. 31, 2009   (DE) .......................... 10 2009 055 445

(51) Int. Cl.
*G01B 7/14* (2006.01)
*G06F 19/00* (2011.01)
(Continued)

(52) U.S. Cl.
CPC .............. *F15B 15/2869* (2013.01); *G01S 13/36* (2013.01); *G01S 13/88* (2013.01)

(58) Field of Classification Search
CPC ........ G01B 7/14; G06F 19/00; F15B 15/2869; G01S 13/88; G01S 13/36
USPC .......................................... 702/150; 324/642
See application file for complete search history.

(56) References Cited

U.S. PATENT DOCUMENTS 3,264,644 A   8/1966   Jacob
4,123,755 A * 10/1978   Fishbein et al. .............. 342/203
(Continued)

FOREIGN PATENT DOCUMENTS

DE            198 33 220     6/1999
DE      20 2005 020 158     3/2007
(Continued)

OTHER PUBLICATIONS

Megej, et al. "Integrated Microwave Sensors for Cavity-Length Measurement in Machine Engineering", IEEE Transactions on Microwave Theory and Techniques, vol. 50, No. 12, Dec. 1, 2002.

*Primary Examiner* — Mohamed Charioui
*Assistant Examiner* — Ruihua Zhang
(74) *Attorney, Agent, or Firm* — Lipsitz & McAllister, LLC (57) ABSTRACT

A method for detecting the position of a piston of a piston cylinder is provided. A microwave transmit signal is emitted in the direction of the piston and microwaves reflected from the piston are detected. The transmit signal is a modulated signal with a base frequency sinusoidally modulated at a modulation frequency. An evaluation of the phase between transmit signals and receive signals is performed. A phase determination at the baseband and a simultaneous phase determination at at least one sideband are also performed. The phase determination at the baseband is used for fine determination of the piston position and the phase determination at the at least one sideband is used for coarse determination of the piston position. Bandpass filtering on receive signals and evaluation transmit signals is performed with respect to the base frequency or an intermediate frequency. Bandpass filtering is performed with respect to the modulation frequency.

33 Claims, 7 Drawing Sheets

(51) Int. Cl.
*F15B 15/28* (2006.01)
*G01S 13/36* (2006.01)
*G01S 13/88* (2006.01)

(56) References Cited

U.S. PATENT DOCUMENTS

| | | | |
|---|---|---|---|
| 4,737,705 A | 4/1988 | Bitar et al. | |
| 4,785,247 A | * 11/1988 | Meador et al. | 324/338 |
| 5,832,369 A | * 11/1998 | Bradley et al. | 455/67.16 |
| 2006/0049975 A1 | * 3/2006 | Knepper et al. | 342/118 |
| 2008/0084922 A1 | * 4/2008 | Kleveland et al. | 375/211 |
| 2010/0011954 A1 | * 1/2010 | Reininger et al. | 92/5 R |
| 2010/0219851 A1 | 9/2010 | Trummer | |

FOREIGN PATENT DOCUMENTS

DE 10 2007 020 046 10/2008
EP 0 303 595 3/1993

\* cited by examiner

METHOD AND APPARATUS FOR DETECTING THE POSITION OF A PISTON OF A PISTON CYLINDER THROUGH THE USE OF MICROWAVES

This application is a continuation of international application number PCT/EP2010/070603 filed on Dec. 22, 2010 and claims the benefit of German application No. 10 2009 055 445.9 filed on Dec. 31, 2009, each of which is incorporated herein by reference in their entirety and for all purposes.

BACKGROUND OF THE INVENTION

The invention relates to a method for detecting the position of a piston of a piston cylinder in which a microwave transmit signal is emitted in the direction of the piston and microwaves reflected from the piston are detected.

The invention further relates to an apparatus for measuring the position of a piston of a piston cylinder, said apparatus comprising a microwave transmitting device and a microwave receiving device which are at least partially arranged at the piston cylinder, wherein the microwave transmitting device emits transmit signals in the direction of the piston and the microwave receiving device receives and detects receive signals, and an evaluation device.

DE 20 2005 020 158 U1 discloses a measuring system for measuring the distance to a medium to be measured, said measuring system comprising a hollow conductor having a first end and a second end for conducting electromagnetic waves to the medium to be measured, a transmitter attachable to the first end for emitting a modulated electromagnetic wave into the hollow conductor, a receiver attachable to the first end for receiving electromagnetic waves coming from the hollow conductor, and an evaluation unit connected to the receiver for detecting the distance to the medium to be measured. Provided in the hollow conductor is a discontinuity which causes a defined portion of the electromagnetic wave guided in the hollow conductor to be reflected back to the receiver, and the evaluation unit is configured to detect the distance to the medium to be measured by comparing the electromagnetic wave reflected from the discontinuity with the electromagnetic wave reflected from the medium to be measured.

DE 10 2007 020 046 A1 discloses a method for determining a distance in which is provided a line structure having a reflective body, said line structure having a feed block with a feed region which connects an HF transceiver to the coupling probe via a waveguide with a dielectric holding system, and the reflective body has a base plate with a collar mounted thereon for forming a cup-shaped element. The distance between the feed point defined by the coupling probe and the reflective body is measured, wherein, via the coupling probe, at least two transmit signals are coupled in, preferably radiated and received, as electromagnetic waves having different frequencies.

DE 198 33 220 A1 discloses a distance measuring apparatus having a sensor device and evaluation electronics in which the sensor device has at least one coupling probe for feeding a transmit signal into a line structure.

U.S. Pat. No. 4,737,705 discloses a linear position sensor which uses a coaxial resonant cavity.

EP 0 303 595 B1 discloses an apparatus for detecting the linear position of a piston and a piston rod in which microwaves are reflected and transverse modes are generated.

The doctoral thesis entitled "Integrated Microwave Sensors for Cavity-Length Measurement in Machine Engineering" by Alexander Megej, published by Schaker Verlag, Aachen, 2002, describes microwave sensors which allow the length of a cylindrical cavity to be determined.

SUMMARY OF THE INVENTION

In accordance with the present invention, a method is provided which allows a high level of measurement accuracy with a high measuring rate and minimally invasive intervention in the piston cylinder.

In accordance with an embodiment of the invention, the transmit signal comprises a modulated signal which has a base frequency sinusoidally modulated at a modulation frequency, an evaluation of the phase between transmit signals and receive signals is performed, a phase determination at the baseband and a simultaneous phase determination at at least one sideband are performed, wherein the phase determination at the baseband is used for a fine determination of the piston position and the phase determination at the at least one sideband is used for the coarse determination of the piston position, and a bandpass filtering on receive signals and evaluation transmit signals is performed with respect to the base frequency or an intermediate frequency, and a bandpass filtering is performed with respect to the modulation frequency.

In the solution in accordance with the invention, the transmit signal is formed by the modulated signal or contains such a modulated signal. The sinusoidal modulation causes the frequency spectrum of the transmit signal to have a baseband with the base frequency and sidebands with integer multiples of the modulation frequency. This makes it possible to use both the baseband and at least one sideband to determine the piston position. The solution in accordance with the invention allows a simultaneous phase determination or running time determination in the baseband (at the base frequency) and at one or more sidebands (at the modulation frequency or an integer multiple thereof).

It is thereby possible to determine the phase difference between transmit signals and receive signals in different ways. In particular, a fine determination can be made by performing an evaluation in the baseband and a coarse determination can be made by performing an evaluation in at least one sideband.

In the baseband, the base frequency provides the scale for the determination. In a sideband, it is the modulation frequency that provides the scale. An unambiguous range of the measurement is greater the smaller the corresponding frequency. Because the modulation frequency is smaller than the base frequency, the unambiguous range in the sideband is greater than that in the baseband.

A phase determination is performed at the baseband. The corresponding information can be used for determining position; in particular, the phase determination at the baseband is used for a fine determination of the piston position.

To this end, provision is made for receive signals and evaluation transmit signals to be bandpass-filtered with respect to the base frequency or an intermediate frequency (where transmit signals contain the intermediate frequency). The corresponding signals for the base frequency can thereby be filtered out and the phase difference determined.

A simultaneous phase determination is performed at at least one sideband. This results in additional information or allows the piston position to be detected absolutely.

In particular, the phase determination at the at least one sideband is used for the coarse determination of the piston position. Via coarsely determining the piston position, the final position determination can then be performed via determining the phase difference in the baseband. The distance measurement is realized not in two steps which are carried out consecutively in time but by simultaneous phase determinations at the at least one sideband and the baseband. A highly accurate absolute distance measurement can thereby be realized.

In particular, the phase of the modulated signal is of the form $\phi_T = 2\pi f_0 t + \eta \sin(2\pi f_m t - \phi_{m0})$, where $f_0$ is the base frequency, $f_m$ is the modulation frequency, $\eta$ is a modulation index and $\phi_{m0}$ is a constant.

Correspondingly, the phase of the receive signal is of the form $\phi_R = 2\pi f_0 (t-\sigma) + \eta \sin(2\pi f_m (t-\sigma) - \phi_{m0})$.

The running time difference $\sigma$ can be measured. If $\sigma$ is known, then the piston position is, in principle, also known. We have $\sigma = 2l/c$, where $l$ is the distance traveled by a propagation mode between an antenna and the piston and therefore the piston position. $c$ is the phase velocity of said propagation mode in the cylinder space ahead of the piston. As can be seen from the above formula, it is in principle possible to determine sigma at both baseband and at least one sideband.

In particular, the base frequency lies in the gigahertz range and the modulation frequency lies in the megahertz range.

It may also be provided for transmit signals or evaluation transmit signals to be mixed with intermediate frequency signals. Signals which are used for evaluation can thereby be downconverted to the intermediate frequency, with the intermediate frequency then being preferably selected such that corresponding electronic components are available at the intermediate frequency. It is also possible to provide transmit signals with an intermediate frequency. This may facilitate the evaluation.

In that case, it is in particular provided for intermediate frequency signals to be modulated at the modulation frequency. If these modulated intermediate frequency signals are mixed with signals of the base frequency, this results in transmit signals which are frequency-modulated at the modulation frequency on the basis of the base frequency.

In an embodiment, evaluation transmit signals and evaluation receive signals are in each case mixed with intermediate frequency signals. This makes it possible to perform the phase determination in a frequency range of the intermediate frequency signals. This makes it possible for example to use bandpass filters which filter in the range of the intermediate frequency and are available at low cost.

It is advantageous for an intermediate frequency to be smaller than the base frequency in order to facilitate the evaluation.

In particular, the base frequency lies in the gigahertz range and the intermediate frequency lies in the megahertz range. The intermediate frequency is a fixed, invariable frequency.

It is further advantageous for the intermediate frequency to lie between the modulation frequency and the base frequency.

The filtered signals are then mixed, and/or the phase difference between the filtered signals is determined. The phase difference, which is running time-dependent, can in turn be used to determine the piston position.

In an embodiment, evaluation transmit signals and receive signals are mixed. This makes it possible to perform the determination at at least one sideband.

In particular, mixing signals are filtered with respect to a main frequency of the at least one sideband. A plurality of sidebands exist having respective main frequencies. The main frequencies are integer multiples of the modulation frequency. The signal strength of a sideband depends on the modulation index. The modulation index can then be selected such that the greatest signal strength is allocated to a particular nth sideband (with n>1). By use of filtering, said nth sideband having the greatest signal strength can be used for further evaluation. The frequency separation from the base frequency $f_0$ is $n \cdot f_m$ with the modulation frequency $f_m$. This allows simple filtering; for example, the edge steepness of a filter can be reduced etc.

Furthermore, provision is made for signals, after being filtered, to be mixed with further signals, wherein these further signals cause the frequency modulation at the modulation frequency. A signal can thereby be generated which is determined by the sideband.

In an embodiment, provision is made for transmit signals to be generated by mixing signals having the base frequency and intermediate frequency signals.

In particular, the intermediate frequency signals themselves are modulated at the modulation frequency. A transmit signal can thereby be generated which is correspondingly frequency-modulated at the modulation frequency on the basis of the base frequency. With the corresponding method, the evaluation may be simplified.

In particular, evaluation receive signals are generated by mixing receive signals and signals having the base frequency. This provides a simple way of generating evaluation receive signals whose frequency lies in the range of the intermediate frequency. This in turn results in a simplified bandpass filtering.

With respect to the determination at the at least one sideband, it is advantageous for evaluation receive signals and modulated intermediate frequency signals to be mixed and the resulting signals, after being filtered, to be mixed with signals which cause the modulation at the modulation frequency. A coarse determination of the position can thereby be achieved.

It is advantageous for transmit signals to be emitted at at least two different base frequencies and phase determinations to be in each case performed at these at least two different base frequencies. For the case of a priori unknown dielectric constant (permittivity), it is thereby possible, if a corresponding evaluation is performed, to calculate the dielectric constant or to determine the piston position using formulas into which the dielectric constant does not enter. This in turn allows variations in the dielectric constant to be monitored. For example, in the case of hydraulic oil, such variations may be caused by temperature influence and pressure influence and ageing and contamination processes. In principle, it is possible for the transmit signals not to be frequency-modulated at the at least two different base frequencies. Frequency modulation is also possible. It is then advantageous for the modulation frequencies to be different from each other in order to achieve a simple evaluation. For example, provision is made for transmit signals to be emitted at at least three different base frequencies and the phase determinations (running time determinations) to be performed at these three base frequencies. It is thereby possible, in the presence of a priori unknown dielectric constant and/or unknown internal diameter of a cylinder space, to calculate the dielectric constant and/or the internal diameter or to determine the piston position from formulas into which the dielectric constant and/or the internal diameter does not enter.

Provision may be made for the dielectric constant to be detected by performing phase determinations at at least two different base frequencies. If such a phase determination at at least two different base frequencies is performed, then the cavity length (which is determined by the piston position) can be eliminated from the corresponding equations and the dielectric constant can then be determined directly therefrom.

By way of example, the frequencies are selected such that the phase is zero (modulo $2\pi$). For example, the second frequency is then selected such that the phase at said second frequency differs by $2\pi$. This provides a simple way of calculating the dielectric constant.

A further object of the invention is to provide an apparatus of the kind mentioned at the outset which allows a high level of measurement accuracy with a high measuring rate and with minimally invasive intervention in the piston cylinder.

In accordance with the invention, this object is achieved in the apparatus mentioned at the outset in that the microwave transmitting device generates frequency-modulated signals having a base frequency sinusoidally modulated at a modulation frequency, in that a first unit is provided which performs a phase determination of the phase between transmit signals and receive signals at the baseband, in that a second unit is provided which performs a simultaneous phase determination at at least one sideband, in that the first unit comprises a filter device which performs a filtering with respect to the base frequency or an intermediate frequency, and in that the second unit comprises a filter device which performs a filtering with respect to the modulation frequency.

Said apparatus has the advantages already explained in conjunction with the method in accordance with the invention.

A high level of dynamics is obtained by the simultaneously performed phase determinations because both ways of detecting measurement values (fine determination measurement values and coarse determination measurement values) are available at the same time. The permanent availability of these measurement values allows a true absolute measurement that is highly reliable; errors that may be produced by interval tracking are excluded.

A first unit is provided which performs a phase determination of the phase between transmit signals and receive signals at the baseband, and a second unit is provided which performs a phase determination at at least one sideband. By corresponding signal mixing, the phase determination in the baseband can be performed at the first unit and the phase determination at at least one sideband can be performed at the second unit.

The first unit comprises a filter device which performs a filtering and in particular bandpass filtering with respect to the base frequency or an intermediate frequency. The phase determination in the baseband can thereby be carried out.

For the same reason, provision is made for the second unit to comprise a filter device which performs a filtering with respect to the modulation frequency. The phase determination in a sideband can thereby be carried out. Bandpass filtering results in a signal which, by corresponding mixing with a signal causing the modulation at the modulation frequency, can be used for determining phase.

In an embodiment, the first unit includes a mixer which mixes filtered transmit signals and receive signals and/or includes a phase detector for phase determination. This provides a simple way of determining the phase difference as the running time between transmit signals and receive signals, and this in turn allows the piston position to be detected.

It is advantageous for the second unit to comprise a first mixer at which receive signals or evaluation receive signals and transmit signals or evaluation transmit signals are mixed. A signal with components of frequencies of sidebands can thereby be generated.

It is further advantageous for the second unit to comprise a second mixer which mixes signals of the first mixer, after being filtered, with signals causing the frequency modulation. This allows the phase to be determined.

For the same reason, it is advantageous for the second unit to comprise a phase detector which detects the phase difference of mixing signals and signals causing the modulation.

In an embodiment, a mixing device is provided which mixes signals having an output frequency which is the difference between the base frequency ($f_0$) and an intermediate frequency ($f_i$) with intermediate frequency signals modulated at the modulation frequency ($f_m$), wherein the resulting mixing signals are transmit signals, and which mixes receive signals with the signals having the output frequency ($f_0$-$f_i$). This allows a phase determination to be performed at the level of a fixed intermediate frequency. Electronic components which operate on the intermediate frequency and are more cost-effective or faster may be used. The signals having the output frequency can be produced by an oscillator that is not coupled to other oscillators (for modulation purposes). As a result, the output frequency and hence also the base frequency can be easily varied in order to adapt to a particular piston cylinder to be measured.

In an embodiment, a mixing device is provided which mixes signals having the base frequency with intermediate frequency signals modulated at the modulation frequency, wherein the resulting mixing signals are transmit signals, and mixes receive signals with the signals having the base frequency. This embodiment already emits transmit signals containing the intermediate frequency.

In an embodiment, provision is made for the microwave transmitting device to transmit transmit signals of at least a first base frequency and a second base frequency, wherein the first base frequency differs from the second base frequency. This allows the dielectric constant to be determined and monitored, independently of the piston's position. Conversely, it is possible to determine the piston position even if the dielectric constant of a medium within a cylinder space is a priori not known. In principle, the dielectric constant can vary with time, for example owing to temperature influence and pressure influence and ageing processes of the medium or owing to contamination. In the apparatus in accordance with the invention, this can be detected and compensated for.

By way of example, the microwave transmitting device transmits transmit signals of a first base frequency, a second base frequency and a third base frequency, with these three base frequencies being different from each other. It is thereby possible to determine the piston position even if the dielectric constant of a medium within the cylinder space and/or an internal diameter of the cylinder is/are a priori not known.

In the above-mentioned embodiment, it is in principle possible for the transmit signals of the microwave transmitting device not to be frequency-modulated or to be frequency-modulated.

The piston cylinder is in particular a hydraulic cylinder or a pneumatic cylinder.

In an embodiment, an antenna (as part of the microwave transmitting device) is arranged in a first region of a cylinder space that has a smaller diameter than a second region within which the piston moves. This provides a simple way of preventing the piston from striking against the antenna. Furthermore, the influence on the cavity modes produced by the antenna arranged in the cylinder space can be kept low.

A side of the antenna facing towards the piston is then preferably set back relative to a transition between the first region and the second region. This prevents the piston from striking against the antenna. The antenna is surrounded by the medium within the cylinder space. An optimized radiation into the cylinder space is achieved.

It is advantageous for an antenna to be arranged in a cylinder space in such a manner that, together with a receiving space for the antenna, it is a continuation of a coaxial cable with respect to the wave impedance, in particular 50Ω. This reduces reflections at an antenna footpoint.

The method in accordance with the invention can be carried out or is carried out on the apparatus in accordance with the invention.

The following description of preferred embodiments serves to explain the invention in greater detail in conjunction with the drawings.

BRIEF DESCRIPTION OF THE DRAWINGS

FIG. 3 illustrates a schematic representation of a time course of the frequencies of a transmit signal T and a receive signal R with running time difference σ (FIG. 3(a)) and the frequency spectrum (FIG. 3(b));

DETAILED DESCRIPTION OF THE INVENTION

Figure 1:
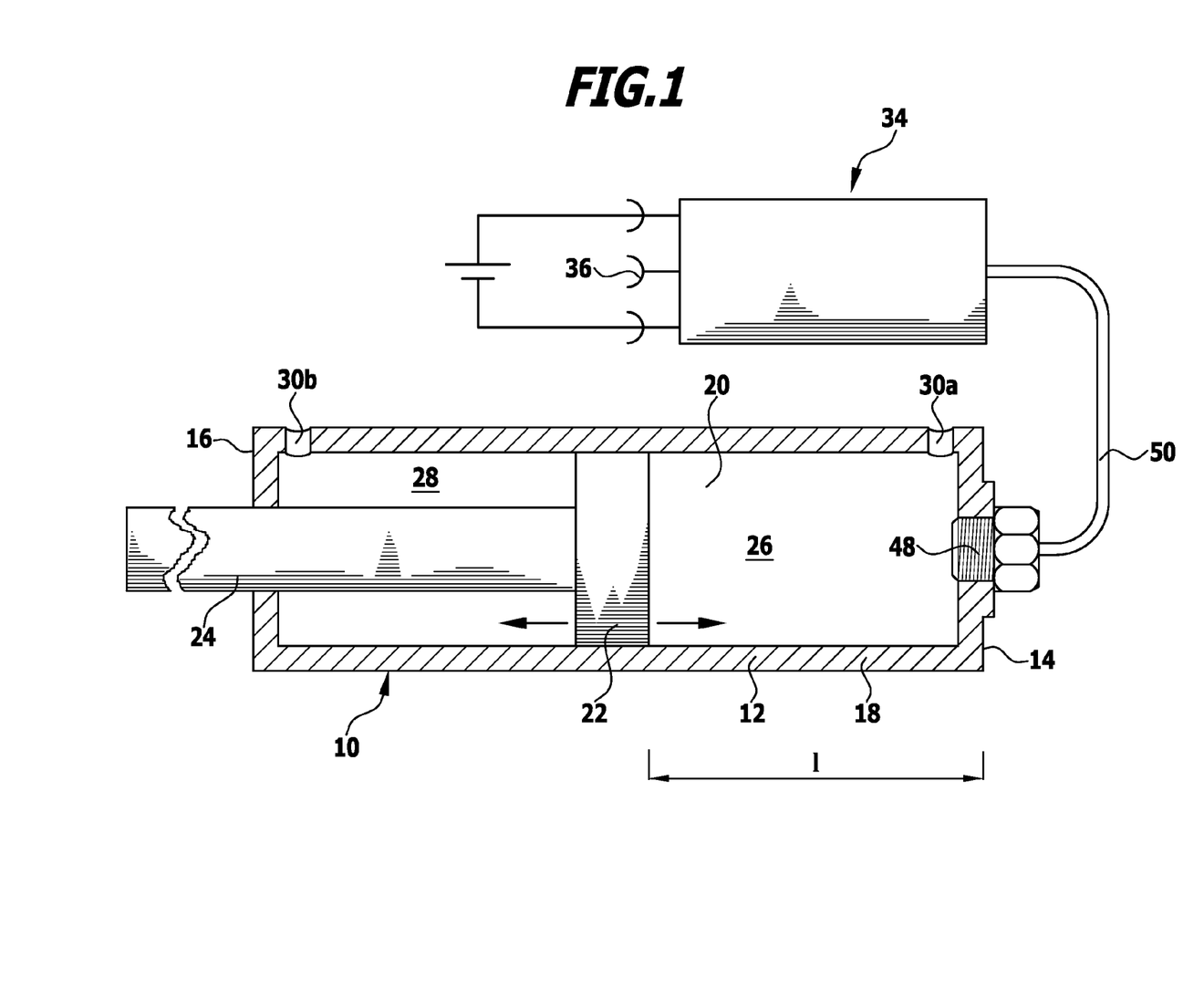
FIG. 1 illustrates a schematic view of a piston cylinder including an apparatus for measuring the position of a piston of the piston cylinder.

An exemplary embodiment of a piston cylinder, which is shown schematically in FIG. 1 and indicated therein by 10, comprises a cylinder 12 having a first end face 14 and an opposing second end face 16. A cylinder space 20 is formed between the first end face 14, the second end face 16 and a wall 18 of the cylinder 12.

Positioned within the cylinder space 20 is a piston 22 which is displaceable in a linear reciprocating motion.

In the exemplary embodiment as illustrated, a piston rod 24 is arranged on the piston 22. The cylinder space 20 is divided into a first subspace 26 and a second subspace 28. The first subspace 26 is of a hollow cylindrical shape, and the second subspace 28 is of an annular cylindrical shape because the piston rod 24 passes through the second subspace 28.

A medium can be arranged in the first subspace 26 and second subspace 28. For a hydraulic cylinder, the medium is a hydraulic oil. For a pneumatic cylinder, the medium is air.

Accordingly, a first inlet/outlet combination 30a and a second inlet/outlet combination 30b for the medium are arranged on the cylinder 12 so as to be associated with the respective subspaces 26, 28. A combination of inlets and outlets is in each case associated with the first subspace 26 and the second subspace 28.

Figure 2:
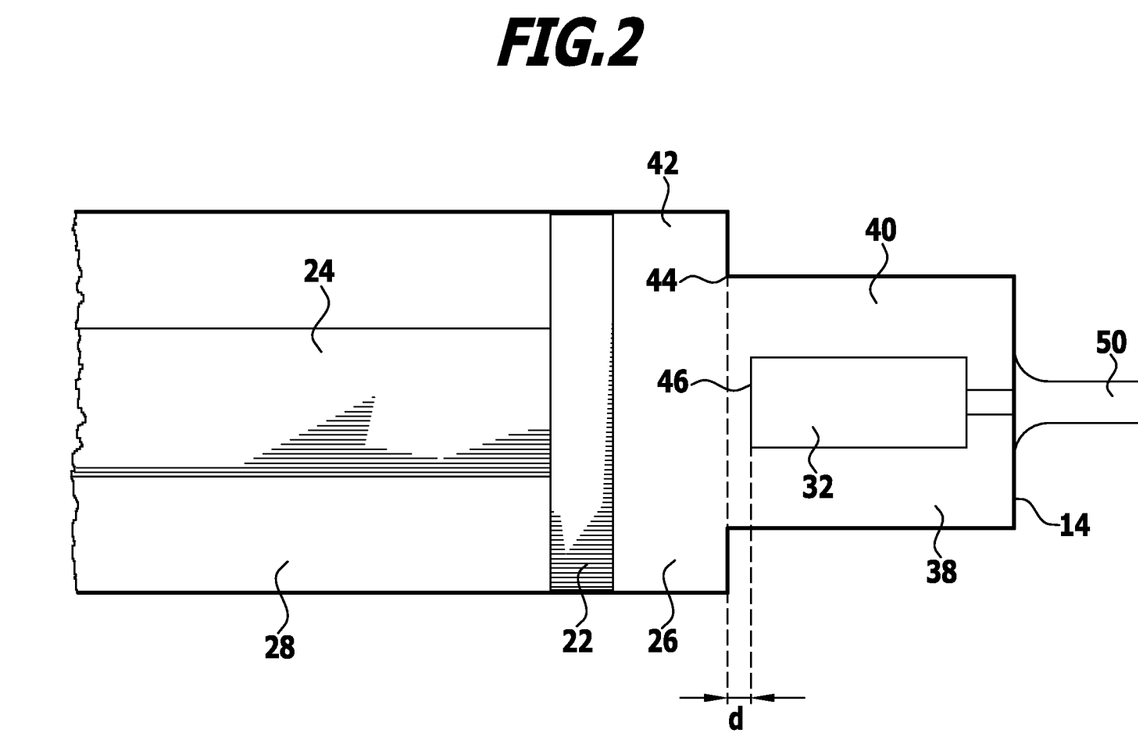
FIG. 2 illustrates a partial view of a modification of a piston cylinder including an antenna.

An antenna 32 is seated at the first end face 14 (FIG. 2). Said antenna is oriented towards the piston 22. Microwave radiation is emitted from the antenna 32 in the direction of the piston 22 and is reflected from there, and the reflected radiation can be received and transmitted by the antenna 32.

The piston cylinder 10 has associated with it an apparatus 34 for measuring the position of the piston 22. The apparatus 34 provides output signals at one or more terminals 36, said signals being characteristic of the position of the piston 22 and in particular of the piston's distance I to the first end face 14.

The apparatus 34 can be separate from the piston cylinder 10, or the piston cylinder 10 can be part of said apparatus 34.

Alternatively or additionally, it is in principle also possible for the second subspace 28 to have an antenna associated with it, said antenna emitting microwave radiation in the direction of the side of the piston 22 that faces towards the second end face 16.

A piston cylinder with a rod eye or a standard cylinder has, for example, a hollow cylindrical first subspace 26 and an annular cylindrical second subspace 28, as depicted in FIG. 1. A constant-velocity cylinder has two annular cylindrical subspaces.

In an embodiment of a piston cylinder, the cylinder 12 has a region, bounded by the first end face 14, which is used as a receiving space 38 for the antenna 32. Said receiving space 38 forms a first region 40 of the corresponding subspace (the first subspace 26 in the example in accordance with FIG. 2). The first region 40 is followed by a second region 42 within which the piston 22 moves. The diameter of the second region 42 is greater than that of the first region 40. A transition 44 between the second region 42 and the first region 40 forms an end face of the cylinder space 20 for the piston movement.

A front side 46 of the antenna 32, which faces the piston 22, is slightly set back relative to said transition 44. An order of magnitude of the corresponding distance d between said front side 46 and the transition 44 (perpendicular to a direction of motion of the piston 22) is of the order of 1 mm, for example. In principle, said distance d is very much smaller than the wavelength at the base frequency.

The antenna 32 is fixed to the corresponding first end face 14 of the piston cylinder 10. For example, it is fixed by way of screwing via a corresponding holder. The antenna 32 has a directional coupler 48 associated with it (FIG. 1). Said directional coupler 48 is arranged behind the antenna 32 and is formed by a milled part, for example.

The antenna 32 is connected to the remaining apparatus 34 via a coaxial cable device 50 (with one coaxial cable each for the transmitting branch and the receiving branch). It is preferably provided for the antenna 32 to be configured such that it constitutes, together with the receiving space 38, a continuation (with respect to the wave impedance) of a coaxial cable (with 50Ω impedance). It is thereby possible to reduce reflections at an antenna footpoint.

In the solution in accordance with the invention, the transmit signal $s_T$ is formed by a frequency-modulated signal having a base frequency $f_0$ and a modulation frequency $f_m$ or (at least) contains such a signal:

$$s_T(t) = A_T(t)\cos\phi_T(t) \quad (1)$$

with phase $$\phi_T(t) = 2\pi f_0 t + \eta \sin(2\pi f_m t - \phi_{m0}) \quad (2).$$

Here, $\phi_{m0}$ is a constant. η is a modulation index with $$\eta = \frac{\Delta f}{2f_m}. \quad (3)$$

Here, Δf is the total frequency deviation at the modulation.

Figure 3A:
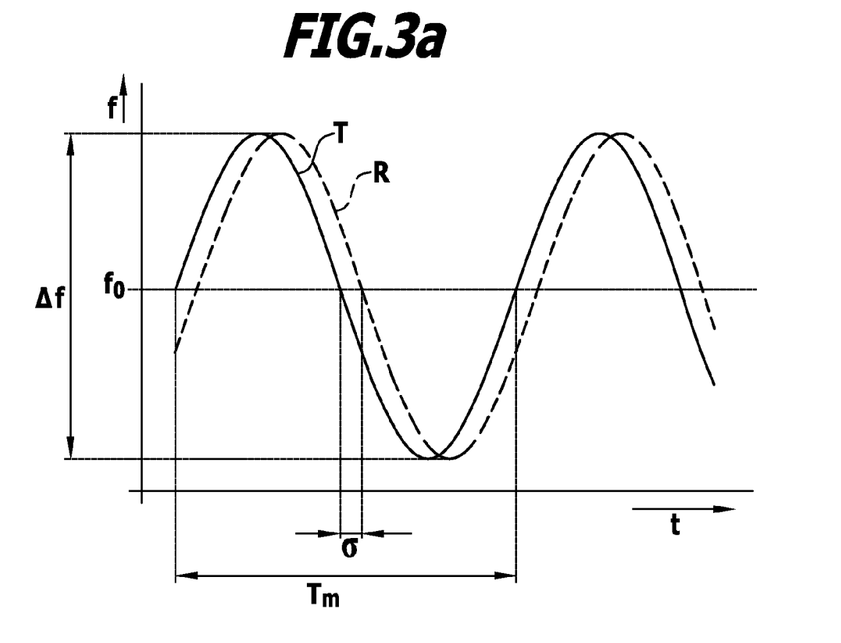

The frequency course for this signal is shown schematically in FIG. 3a).

A back-reflected signal (receive signal) is of the form $$s_R(t) = A_R(t)\cos\phi_R(t) \quad (4)$$

with phase $$\phi_R(t) = 2\pi f_0(t-\sigma) + \eta \sin(2\pi f_m(t-\sigma) - \phi_{m0}) \quad (5).$$

The corresponding frequency course is also shown schematically in FIG. 3(a).

Figure 3B:
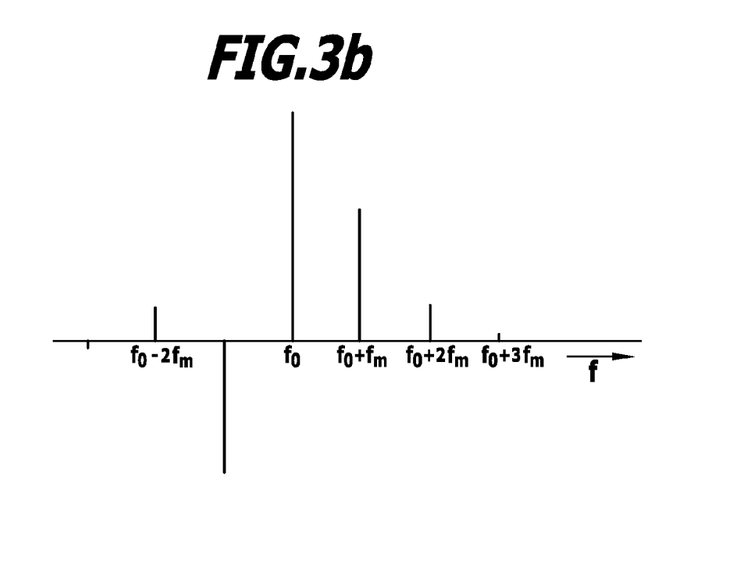

The transmit signal and the receive signal have the same frequency spectrum. A baseband exists with frequency $f_0$ and sidebands exist with frequencies $\pm n \cdot f_m$, wherein n is a natural number.

The signals $s_T$ (and correspondingly $s_R$) can be expanded in terms of Bessel function. So, for example, this then gives:

$$s_T(t)/A_T = J_0(\eta)\cos(2\pi f_0 t - \varphi_{T0}) + \qquad (6)$$
$$J_1(\eta)\cos(2\pi(f_0 + f_m)t) - J_1(\eta)\cos(2\pi(f_0 - f_m)t) + \ldots .$$

If transmit signal and receive signal are mixed, this then gives:

$$s_M(t) = s_T(t) \otimes s_R(t) \qquad (7)$$
$$= A_T \cdot A_R J_0(\alpha)\cos 2\pi f_0 \sigma -$$
$$A_T \cdot A_R 2 J_1(\alpha)\sin(2\pi f_0 \sigma) \cdot \cos\left(2\pi f_m\left(t - \frac{\sigma}{2}\right) - \varphi_{m0}\right) \pm \ldots ,$$

where $\alpha$ is a receive-side modulation index:

$$\alpha = 2\eta \sin(\pi f_m \sigma) \qquad (8).$$

Formula (7) shows that, in principle, by the described mixing of the signals and filtering with respect to the base frequency $f_0$, the running time difference $\sigma$ and hence the piston position I can be determined. We have $\sigma = 2I/c$ with phase velocity c in the subspace 26.

If the above-mentioned mixing signal $s_M$ is mixed with a signal $s_{mod}$ causing the frequency modulation, this then gives a signal $s_G$ of the form $$s_G(t) = s_{mod}(t) \otimes s_M(t) \qquad (9)$$
$$= A_T \cdot A_R A_{mod} \sin(2\pi f_0 \sigma) J_1(\alpha)\cos(\pi f_m \sigma) + \ldots .$$

It can be seen that if a frequency filtering is performed at the main sideband frequency $f_m$, the running time difference and therefore the piston position can also be determined via the sideband. In principle, this method can also be performed for higher sidebands with multiples of the modulation frequency, with the signal strength being the greatest at the first sideband having the main frequency $f_m$.

Figure 4:
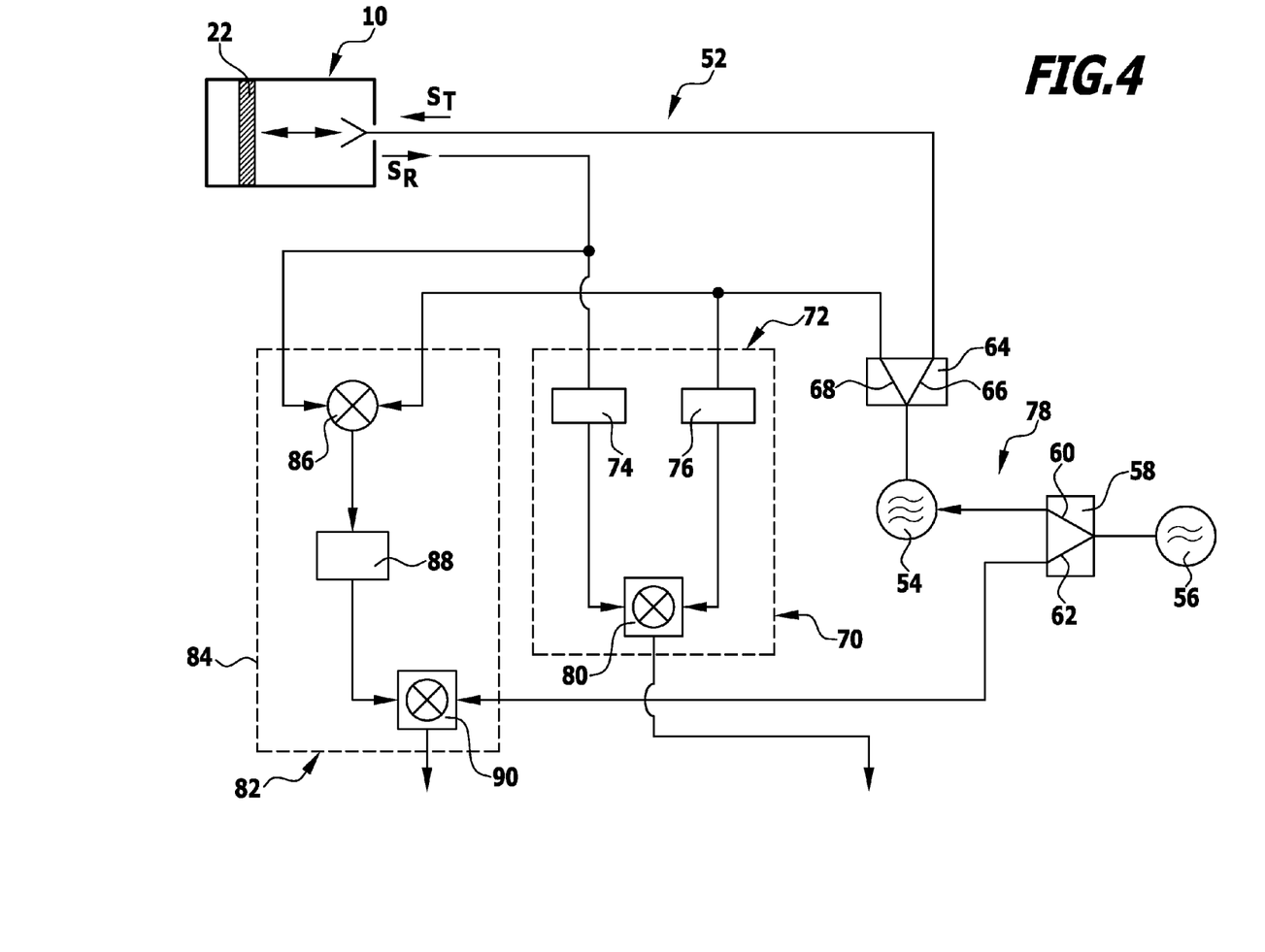
FIG. 4 illustrates a schematic representation of a first exemplary embodiment of an apparatus in accordance with the invention.

A first embodiment of an apparatus in accordance with the invention, which is shown schematically in FIG. 4 and indicated therein at 52, comprises an oscillator 54 which generates microwave radiation of base frequency $f_0$. Coupled to said oscillator 54 is a further oscillator 56 which provides the frequency modulation at frequency $f_m$. The oscillator 56 is coupled to the oscillator 54 via a power divider 58. The power divider 58 comprises a first branch 60 and a second branch 62. Coupling of the oscillator 56 to the oscillator 54 for generating the signal $s_T$ is via the first branch 60.

The oscillator 54 is followed by a power divider 64 which likewise comprises a first branch 66 and a second branch 68. The first branch 66 is coupled to the antenna 32. A transmit signal is sent via the first branch 66 to the piston cylinder 10 and emitted from there into the first subspace 26 by the antenna 32.

The second branch 68 serves to provide an evaluation transmit signal which is used for evaluation and has exactly the same characteristics, including phase position, as the emitted transmit signal.

The apparatus 52 has a first unit 70 which serves for phase determination of the phase between the transmit signals and receive signals.

The first unit 70 comprises a filter device 72 having a first filter 74 and a second filter 76. The first filter is coupled to an input terminal and thus directly to the antenna 32. Receive signals from the piston cylinder 10 go directly to the first filter 74. The second filter 76 is coupled via the second branch 68 to a microwave transmitting device 78, said microwave transmitting device comprising the oscillators 54 and 56.

The filters 74, 76 of the filter device 72 are formed by SAW filters, for example. These have steep filter characteristics with relatively low cost and small size.

The first filter 74 and the second filter 76 are each bandpass filters which are designed for the baseband with frequency $f_0$ and pass this frequency and a narrow range of frequencies around that frequency.

The first filter 74 and the second filter 76 perform a filtering with respect to the baseband with base frequency $f_0$.

On the output side, the first filter 74 and the second filter 76 are coupled to a mixer 80. The mixer 80 mixes the frequency-filtered signals originating from the filters 74 and 76. The signal in accordance with Formula (7) is thereby generated, with no components at the sidebands. The phase difference or the running time difference between transmit signal and receive signal at the baseband with frequency $f_0$ is thereby detected and determined directly.

Said running time difference can in turn be used to determine the piston position.

A signal is obtained (refer to Formula (7)) which is a direct voltage signal and is unambiguous in the range between the position I=0 (where the piston 22 abuts the transition 44) and half the wavelength in the cylinder or periodic repetitions of that range.

The apparatus 52 further comprises a second unit 82 for phase determination of the phase between transmit signals and receive signals at one or more sidebands. The second unit 82 and the first unit 70 are part of a microwave receiving device 84.

The second unit 82 has a first mixer 86. This includes a first input which is adapted to couple in receive signals $s_R$. It further includes a second input which is coupled to the second branch 68 of the power divider 64. At the first mixer 86, mixing is performed in accordance with Formula (7), generating the signal $s_M$.

The mixer is followed by a filter device 88 including a bandpass filter which is selective for one or more sidebands. In a preferred exemplary embodiment, the filter device 88 is selective for frequency $f_m$, i.e. it passes this main frequency of the first sideband (refer to Formula (7)) at a narrow bandwidth. Alternatively or additionally, it is in principle possible for higher sidebands to be passed; however, because the signal strength is reduced at higher sidebands, the first sideband is preferable.

The second unit 82 further comprises a second mixer 90 which follows the filter device 88. The signal filtered by the filter device 88 is fed to said second mixer 90. Furthermore, the second mixer 90 is coupled to the oscillator 56 via the second branch of the power divider 58. The signal originating from the first mixer 86 and filtered by the filter device 88 and the signal causing the modulation of the transmit signal are mixed in the second mixer 90.

This then gives a direct voltage signal (refer to Formula (9)) which is unambiguous in a measuring range between zero and $c/f_m$, where c is the phase velocity in the first subspace 26.

This unambiguous range is greater than the unambiguous range of the first unit 70; there, the unambiguous range is determined by $c/f_0$.

Therefore, the second unit 82 can be used for a coarse measurement to find the position and the first unit 70 can be used for a fine measurement of the position.

It can be seen from Formula (9) that the coefficient sine ($2\pi f_0 \sigma$) contained in said formula may become zero for certain values of G. When the amplitude is zero, a measurement of phase is no longer possible.

This can be remedied by the second mixer 90 being configured as a quadrature mixer. This then gives, after mixing with the signal causing the modulation, $$s_{GI}(t) = A_I \sin(2\pi f_0 \sigma) J_1(\alpha) \cos(\pi f_m \sigma)$$

and $$s_{GQ}(t) = A_Q \cos(2\pi f_0 \sigma) J_1(\alpha) \cos(\pi f_m \sigma) \quad (10)$$

If the signal $s_{GI}$ is zero or very small because of the factor $\sin(2\pi f_0\sigma)$, then the signal $s_{GQ}$ can be evaluated, it being maximal in this case. If the signal $s_{GQ}$ is zero or very small because of the factor $\cos(2\pi f_0\sigma)$, then the signal $s_{GI}$ can be evaluated, it being maximal in this case.

The above-mentioned disadvantage then no longer exists.

The first subspace 26 as a waveguide has a certain cutoff frequency $\lambda_c$. The vacuum wavelength is $\lambda_0 = c_0/f_0$ with $c_0$ as the phase velocity in vacuum.

In order to achieve as high a measuring accuracy as possible, the modulation frequency should be as high as possible. However, in order for an unambiguous measurement to be performed, the running time $\sigma$ must not exceed the period duration $T_m$ of the modulation frequency.

This gives the condition $$f_m \leq \frac{c_0}{l_{max}\sqrt{\varepsilon_R\mu_R}} \frac{1}{\sqrt{1-(\lambda_0/\lambda_c)^2}} \quad (11)$$

for the maximum modulation frequency. Here, $I_{max}$ is the maximum piston stroke, $\in_R$ is the dielectric constant of the medium within the first subspace 26 and $\mu_R$ is the corresponding magnetic permeability.

By way of example, if we assume a dielectric constant $\in_R=2.2$ (which is a typical value for hydraulic oil), $\mu_R=1$, a maximum piston stroke of 2 m and a wavelength in vacuum-to-cutoff wavelength ratio of 0.82, then the upper limit for the modulation frequency $f_m$ is found to be approx. 170 MHz.

Figure 5:
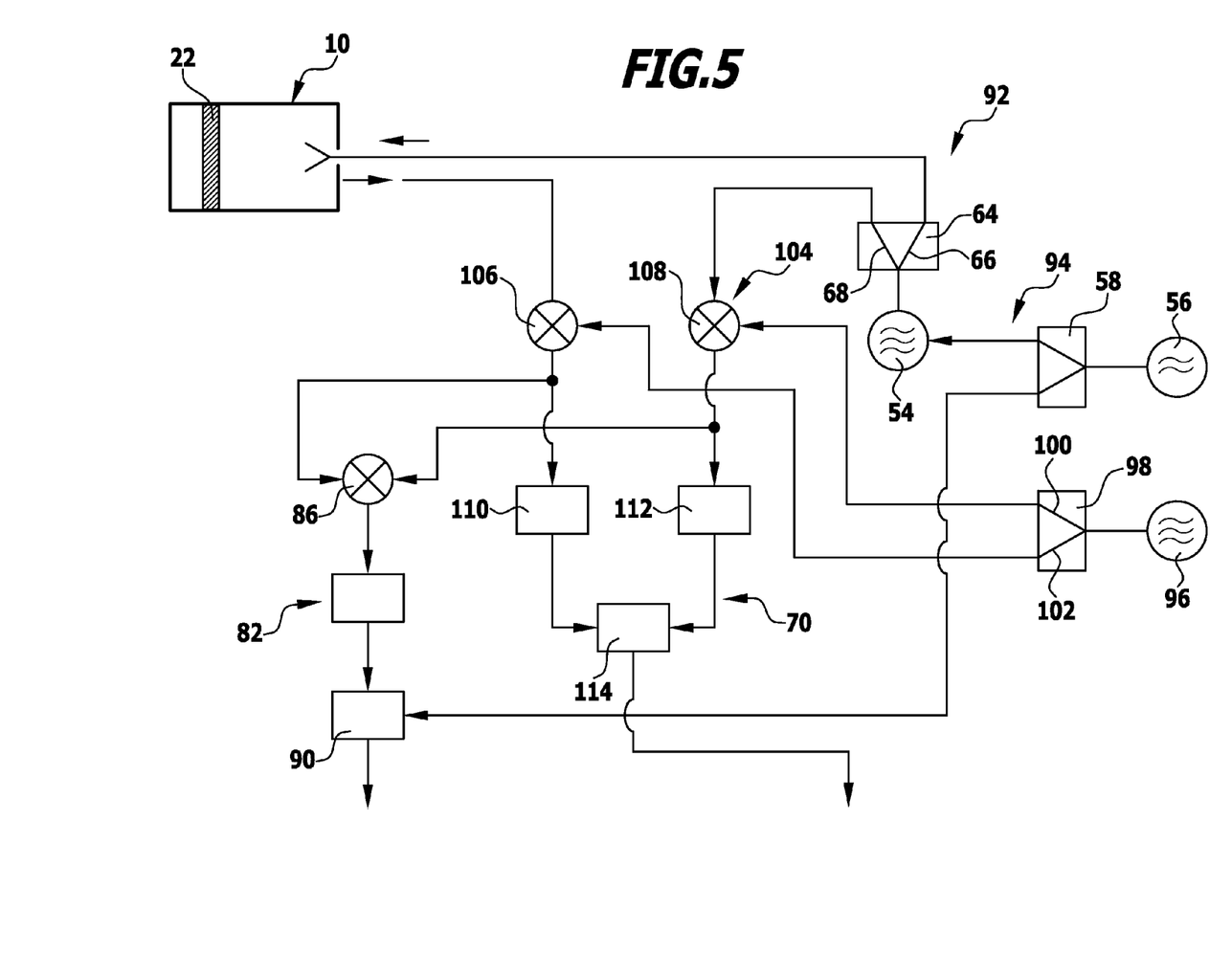
FIG. 5 illustrates a schematic representation of a second exemplary embodiment.

A second embodiment of an apparatus in accordance with the invention, which is shown schematically in FIG. 5 and indicated therein at 92, comprises a microwave transmitting device 94 including a first oscillator 54 and a second oscillator 56. Corresponding power dividers 58 and 64 are provided. The construction is generally the same as the one described with reference to the apparatus 52; therefore, the same reference numerals are used.

Provision is made for a third oscillator 96 which provides frequency-stable intermediate frequency signals. The intermediate frequency lies below the frequency of the first oscillator 54.

The third oscillator 96 is followed by a power divider 98 having a first branch 100 and a second branch 102.

The apparatus comprises a mixing device, generally indicated at 104, including a first mixer 106 and a second mixer 108. The first mixer 106 is coupled to the oscillator 96 via the second branch 102. Furthermore, a receive signal is fed to an input of the mixer 106. Receive signals and intermediate frequency signals are mixed in the mixer 106. Receive signals are thereby downmixed to the intermediate frequency.

One input of the second mixer 108 is coupled to the first oscillator 54 via the second branch 68. This provides the second mixer 108 with evaluation transmit signals which correspond to transmit signals. A further input of the second mixer 108 is coupled to the oscillator 96 via the first branch 100 of the power divider 98.

Evaluation transmit signals and intermediate frequency signals are mixed in the second mixer 108, thereby generating evaluation transmit signals which are downconverted to the intermediate frequency.

Outputs of the mixing device 104, with its mixers 106 and 108, are coupled to a first unit and a second unit. These are generally of the same configuration as the first unit 70 and second unit 82 described above in conjunction with the apparatus 52. The same reference numerals are generally used.

The first unit 70 comprises filters 110, 112 which are band-pass filters for the intermediate frequency.

A phase detector 114 then detects the phase difference between the corresponding signals which are downconverted to the intermediate frequency. The phase difference thus detected can in turn be used to determine the piston position for the fine measurement.

Otherwise, the apparatus 92 works as described with reference to the apparatus 52.

The downconversion to the intermediate frequency, with a typical value of the intermediate frequency being 800 MHz, may simplify the evaluation because appropriate electronic components can be employed.

The apparatus 52 operates on the homodyne principle.

The apparatus 92 operates on the heterodyne principle.

Figure 6:
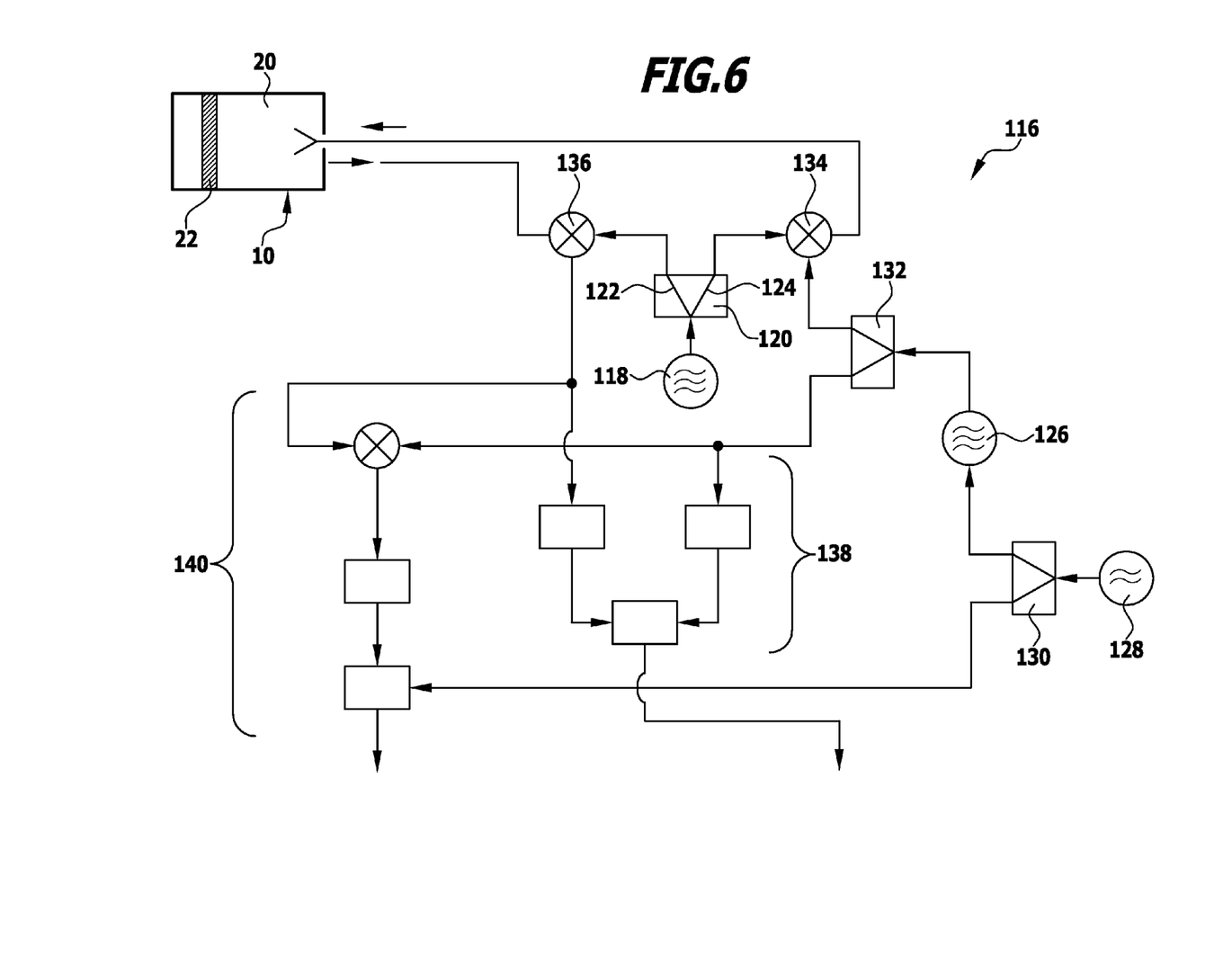
FIG. 6 illustrates a schematic representation of a third exemplary embodiment.

A further exemplary embodiment of an apparatus in accordance with the invention, shown in FIG. 6 and indicated therein at 116, comprises a first oscillator 118. This provides a fixed frequency which is the base frequency $f_0$ minus an intermediate frequency $f_i$. Said first oscillator 118 is followed by a power divider 120 having a first branch 122 and a second branch 124.

Further, a second oscillator 126 is provided which generates intermediate frequency signals having the intermediate frequency $f_i$. Coupled to said second oscillator is a third oscillator 128 which frequency-modulates the intermediate frequency signals at the modulation frequency $f_m$. Coupling is via a power divider 130. The intermediate frequency signals frequency-modulated at the modulation frequency are fed via a power divider 132 to a mixer 134. The signals of the first oscillator 118 are present at a further input of said mixer 134. Said mixer 134 generates transmit signals having the base frequency $f_0$ which are emitted into the cylinder space 20 of the piston cylinder 10.

Arranged in a receiving lane of the apparatus 116 is a further mixer 136 which receives receive signals at an input side thereof and receives signals of the first oscillator 118 at a further input thereof. Said mixer 136 thus mixes receive signals and signals of the frequency $f_0-f_i$.

A first unit 138 is provided which determines the phase difference between transmit signals and receive signals at the baseband. Further, a second unit 140 exists which determines the phase difference between transmit signals and receive signals at a sideband.

The first unit 138 receives evaluation receive signals as input signals, said signals being provided by the mixer 136. The first unit 138 further receives at its input side frequency-modulated intermediate frequency signals via the power divider 132.

At the first unit 138, a bandpass filtering with respect to the intermediate frequency is then performed in each case on the evaluation receive signals and on the signals provided by the power divider 132, as described above.

At an input side, the second unit 140 is coupled to the mixer 136, which provides the evaluation receive signals. Its input side is further coupled to the power divider 132. Said signals are mixed and bandpass-filtered with respect to the modulation frequency $f_m$, followed by mixing with the signal causing the modulation at frequency $f_m$.

The first oscillator 118 is not modulated and therefore easily adaptable. It is easily adaptable to a piston cylinder of a given cylinder geometry to be measured simply by adjusting its frequency.

The apparatus 116 also operates on the heterodyne principle. The mixers 134 and 136 receive signals of the fixed frequency $f_0-f_i$ via the first oscillator 118. The modulated intermediate frequency signal is coupled into the mixer 134, which generates the transmit signal.

Otherwise, the apparatus 116 works as described above.

The detected phase information can then be used to determine the position I of the piston 22 in the piston cylinder 10. Any linearity error that may arise can be compensated by a linearization method. To this end, a look-up table is used, for example.

Phase detectors are used for detecting the phases for the coarse determination and fine determination, in particular when operating on the heterodyne principle. In particular, provision is made for output voltages of said phase detectors to be fed to a simultaneous A/D converter in order to detect all of the information uniformly even while the piston 22 is being moved.

Figure 7:
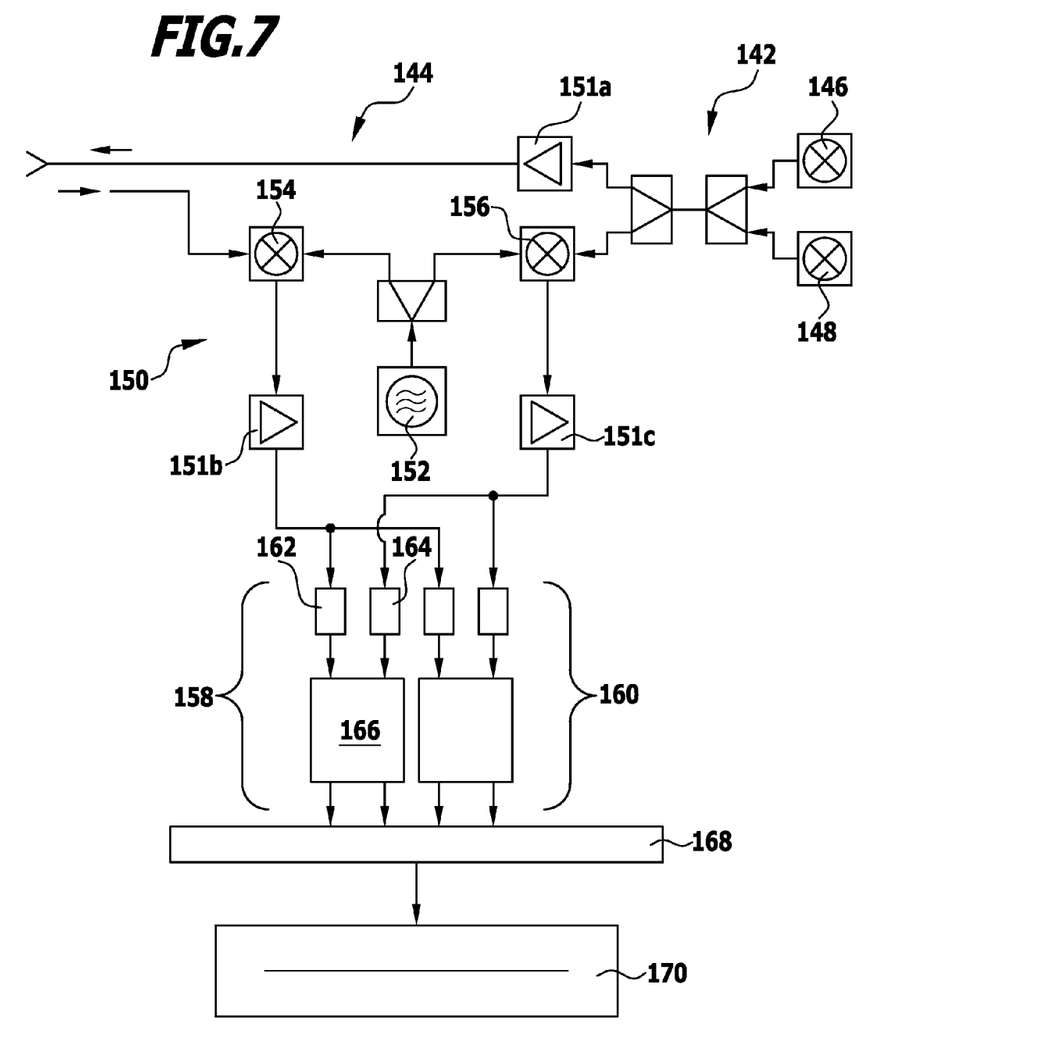
FIG. 7 illustrates a schematic representation of a fourth exemplary embodiment.

A further exemplary embodiment of an apparatus in accordance with the invention, shown schematically in FIG. 7 and indicated therein at 142, comprises a microwave transmitting device 144 which couples microwave radiation into the piston cylinder 10. The microwave transmitting device 144 comprises a first oscillator 146 and a second oscillator 148. The first oscillator 146 provides a signal of a base frequency $f_0^1$. The second oscillator 148 provides a signal of a base frequency $f_0^2$. The frequencies $f_0^1$ and $f_0^2$ differ from one another.

The first oscillator 146 and the second oscillator 148 are arranged in parallel to one another. The signals with frequency $f_0^1$ and $f_0^2$ are simultaneously emitted and are simultaneously applied to the cylinder space 20, with these signals being in particular amplified in an isolation amplifier 151a.

In an embodiment, provision is made for an additional frequency modulation as described above. In this case, the oscillators 146 and 148 are then substituted by corresponding units which in each case provide frequency-modulated transmit signals with base frequencies $f_0^1$ and $f_0^2$. In principle, it is then advantageous for the modulation frequencies of the two units to be different as well, in order to be able to separate these signals.

The apparatus 142 comprises a microwave receiving device 150. The microwave receiving device 150 includes a third oscillator 152 which provides intermediate frequency signals. Further, a first mixer 154 is provided which receives receive signals at an input side thereof and receives the intermediate frequency signals at a further input thereof. At the first mixer 154, receive signals are downconverted to the intermediate frequency, and these signals are amplified in an isolation amplifier 151b. Further, a second mixer 156 exists. Said second mixer 156 receives evaluation transmit signals which are diverted from transmit signals and are identical to the transmit signals in terms of the corresponding characteristics. The second mixer 156 further receives intermediate frequency signals. It thereby generates evaluation transmit signals which are downconverted to the intermediate frequency. These signals are amplified in an isolation amplifier 151c.

The apparatus 142 further comprises a first unit 158 and a second unit 160 which detect the phase between transmit signals and receive signals and are generally identical in configuration. The first unit is allocated to the frequency $f_0^1$, and the second unit is allocated to the frequency $f_0^2$.

The first unit 158 comprises a filter device having a first filter 162 and a second filter 164. Evaluation receive signals which have been generated by the first mixer 154 are fed to an input of the first filter 162. Evaluation transmit signals which have been generated at the second mixer 156 are fed to an input of the second filter 164.

The first filter 162 and the second filter 164 are each bandpass filters which pass frequencies in a range around the intermediate frequency.

Following the first filter 162 and the second filter 164 is a phase detector 166. This detects the phase position between the evaluation transmit signals and evaluation receive signals and therefore between the transmit signals and the receive signals for the frequency $f_0^1$.

Signals of the phase detector 166 are provided to an evaluation device 168.

As mentioned above, the second unit 160 is of identical configuration, with the second unit 160 performing the corresponding measurements for the frequency $f_0^2$.

The evaluation device 168 is associated with a computing unit 170 which evaluates the measured data.

It is also possible for the signals having the two base frequencies not to be fed into the piston cylinder simultaneously but alternating in time. To this end, the signals of the oscillators 146 and 148 can be switched on in an alternating manner by a switch.

In a circular conductor (cylindrical cavity), the phase shift due to the signal running time is $$\varphi_0 = \frac{4\pi l}{\lambda_0}\sqrt{\varepsilon_R \mu_R \left(1 - \frac{\lambda_0^2}{\lambda_c^2}\right)} \tag{12}$$

Here, $\lambda_0 = c_0/f_0$ is the wavelength in air, $\varepsilon_R$ is the dielectric constant, $\mu_R$ is the magnetic permeability and $\lambda_c$ is the cutoff wavelength of the corresponding hollow cylindrical cavity.

The cutoff wavelength $\lambda_c$ is frequency-dependent and depends on the radius $r_i$ of the cylinder space 20. The dielectric constant $\varepsilon_R$ is no more than slightly frequency-dependent in the relevant frequency range.

If the phase or running time σ for at least two different frequencies is determined at the same piston position, then the piston position I (length of the cylindrical cavity) can be determined therefrom without knowledge of the dielectric constant. Correspondingly, when $r_i$ is known, the dielectric constant can be calculated. Refer to Formula (12); this equation can be solved for $\varepsilon_R$. If this is done for (at least) two base frequencies, this then gives an equation in which $\varepsilon_R$ no longer enters and which allows the piston position to be calculated. If the piston position is known and the radius is known, then the dielectric constant can be calculated from (12).

This makes it possible to determine the dielectric constant when it is not known exactly. In particular, it is also possible to monitor a variation of the dielectric constant with time, for example in a hydraulic oil. Such a variation with time may occur for example as a result of ageing processes, contamination, temperature influence, pressure influence, or the like.

It is then possible to determine the dielectric constant independently of the measurement of the piston's position and even while in operation.

In an embodiment for determining the dielectric constant, defined phases are predetermined for different frequencies. By way of example, a first frequency $f_0$ is selected such that the phase is zero (modulo $2\pi$) and a second frequency $f_0$ is selected such that the phase is also zero (modulo $2\pi$) but with a different factor. By way of example, the phase for the first frequency $f_0$ is $n \times 2\pi$ and the phase for the second frequency $f_0$ is $(n+1) \times 2\pi$. It is then easily possible to determine $\in_R$ from Equation (12).

If the piston position I is known, it is also possible to calculate the internal radius $r_i$ of the cylinder space 20.

This solution can also be implemented when frequency-modulated transmit signals are used, as mentioned in conjunction with the apparatuses 52, 92 and 116.

If the same amplitude is used for transmit signals having different frequencies, then it is also possible, using ratio formation, to achieve a ratio that is independent of the amplitudes (refer to Equations (7), (9) and (10)).

LIST OF REFERENCE NUMBERS

10 Piston cylinder
12 Cylinder
14 First end face
16 Second end face
18 Wall
20 Cylinder space
22 Piston
24 Piston rod
26 First subspace
28 Second subspace
30a First inlet/outlet combination
30b Second inlet/outlet combination
32 Antenna
34 Apparatus
36 Terminal
38 Receiving space
40 First region
42 Second region
44 Transition
46 Front side
48 Directional coupler
50 Coaxial cable device
52 Apparatus (first exemplary embodiment)
54 Oscillator
56 Oscillator
58 Power divider
60 First branch
62 Second branch
64 Power divider
66 First branch
68 Second branch
70 First unit
72 Filter device
74 First filter
76 Second filter
78 Microwave transmitting device
80 Mixer
82 Second unit
84 Microwave receiving device
86 First mixer
88 Filter device
90 Second mixer
92 Apparatus (second exemplary embodiment)
94 Microwave transmitting device
96 Third oscillator
98 Power divider
100 First branch
102 Second branch
104 Mixing device
106 First mixer
108 Second mixer
110 Filter
112 Filter
114 Phase detector
116 Apparatus (third exemplary embodiment)
118 First oscillator
120 Power divider
122 First branch
124 Second branch
126 Second oscillator
128 Third oscillator
130 Power divider
132 Power divider
134 Mixer
136 Mixer
138 First unit
140 Second unit
142 Apparatus (fourth exemplary embodiment)
144 Microwave transmitting device
146 First oscillator
148 Second oscillator
150 Microwave receiving device
151a,b,c Amplifier
152 Third oscillator
154 First mixer
156 Second mixer
158 First unit
160 Second unit
162 First filter
164 Second filter
166 Phase detector
168 Evaluation device
170 Computing unit

The invention claimed is:

1. Method for detecting the position of a piston of a piston cylinder, comprising:
   emitting microwave transmit signals in a direction of the piston and detecting microwaves reflected from the piston in receive signals;
   the transmit signals comprising modulated signals which have a base frequency sinusoidally modulated at a modulation frequency;
   performing an evaluation of a phase difference between evaluation transmit signals and the receive signals, the evaluation transmit signals corresponding in their characteristics to the transmit signals;
   performing a determination of the phase difference between the evaluation transmit signals and the receive signals at a baseband and a simultaneous determination of the phase difference between the evaluation transmit signals and the receive signals at at least one sideband;

using the phase difference at the baseband for a fine determination of the piston position and the phase difference at the at least one sideband for a coarse determination of the piston position;

bandpass filtering the receive signals and the evaluation transmit signals with respect to the base frequency or an intermediate frequency; and bandpass filtering the receive signals and the evaluation transmit signals with respect to the modulation frequency;

wherein a phase of the modulated signal is of the form $$\phi_T = 2\pi f_0 t + \eta \sin(2\pi f_m t - \phi_{m0})$$

where $f_0$ is the base frequency, $f_m$ is the modulation frequency, $\eta$ is a modulation index and $\phi_{m0}$ is a constant.

2. Method in accordance with claim 1, wherein an evaluation of a running time between the transmit signals and the receive signals is performed.

3. Method in accordance with claim 1, wherein the phase of the receive signals is of the form $$\phi_R = 2\pi f_0(t-\sigma) + \eta \sin(2\pi f_m(t-\sigma) - \phi_{m0})$$

with a running time difference $\sigma$.

4. Method in accordance with claim 1, wherein the base frequency lies in the gigahertz range and the modulation frequency lies in the megahertz range.

5. Method in accordance with claim 1, wherein the transmit signals or the evaluation transmit signals are mixed with intermediate frequency signals.

6. Method in accordance with claim 5, wherein the intermediate frequency signals are modulated at the modulation frequency.

7. Method in accordance with claim 1, wherein the evaluation transmit signals and evaluation receive signals are in each case mixed with intermediate frequency signals.

8. Method in accordance with claim 5, wherein the intermediate frequency is smaller than the base frequency.

9. Method in accordance with claim 8, wherein the base frequency lies in the gigahertz range and the intermediate frequency lies in the megahertz range.

10. Method in accordance with claim 8, wherein the intermediate frequency lies between the modulation frequency and the base frequency.

11. Method in accordance with claim 1, wherein at least one of (i) mixing the filtered signals which have been subjected to the bandpass filtering with respect to the base frequency or the intermediate frequency, or (ii) determining a phase difference between the filtered signals is performed.

12. Method in accordance with claim 1, wherein the evaluation transmit signals and the receive signals are mixed.

13. Method in accordance with claim 12, wherein mixing signals are filtered with respect to a main frequency of the at least one sideband.

14. Method in accordance with claim 13, wherein signals, after being filtered, are mixed with further signals, wherein said further signals cause the frequency modulation at the modulation frequency ($f_m$).

15. Method in accordance with claim 1, wherein the transmit signals are generated by mixing signals having the base frequency and intermediate frequency signals.

16. Method in accordance with claim 15, wherein the intermediate frequency signals themselves are modulated at the modulation frequency.

17. Method in accordance with claim 15, wherein evaluation receive signals are generated by mixing receive signals and signals having the base frequency.

18. Method in accordance with claim 17, wherein evaluation receive signals and modulated intermediate frequency signals are mixed and the resulting signals, after being filtered, are mixed with signals which cause the modulation at the modulation frequency.

19. Method in accordance with claim 1, wherein the transmit signals are emitted at at least two different base frequencies and phase determinations are in each case performed at these at least two different base frequencies.

20. Method in accordance with claim 19, wherein a dielectric constant is detected by performing phase determinations at the at least two different base frequencies.

21. Apparatus for measuring the position of a piston of a piston cylinder, comprising:

a microwave transmitting device and a microwave receiving device which are at least partially arranged at the piston cylinder;

the microwave transmitting device emitting transmit signals in a direction of the piston and the microwave receiving device receiving and detecting receive signals reflected from the piston;

an evaluation device for performing an evaluation of a phase difference between evaluation transmit signals and the receive signals, the evaluation transmit signals corresponding in their characteristics to the transmit signals;

the microwave transmitting device generates the transmit signals which comprise frequency-modulated signals having a base frequency ($f_0$) sinusoidally modulated at a modulation frequency ($f_m$);

a first unit which performs a determination of a phase difference between the evaluation transmit signals and the receive signals at a baseband, the phase difference at the baseband being used for a fine determination of the piston position; and a second unit which performs a simultaneous determination of the phase difference between the evaluation transmit signals and the receive signals at at least one sideband, the phase difference at the at least one sideband being used for a coarse determination of the piston position;

wherein:

the first unit comprises a filter device which performs a filtering of the receive signals and evaluation transmit signals with respect to the base frequency or an intermediate frequency;

the second unit comprises a filter device which performs a filtering of the receive signals and evaluation transmit signals with respect to the modulation frequency ($f_m$);

a phase of the modulated signal is of the form $$\phi_T = 2\pi f_0 t + \eta \sin(2\pi f_m t - \phi_{m0})$$

where $f_0$ is the base frequency, $f_m$ is the modulation frequency, $\eta$ is a modulation index and $\phi_{m0}$ is a constant.

22. Apparatus in accordance with claim 21, wherein the first unit includes at least one of a mixer which mixes filtered transmit signals and receive signals or a phase detector for phase determination.

23. Apparatus in accordance with claim 21, wherein the second unit comprises a first mixer at which the receive signals or evaluation receive signals and the transmit signals or the evaluation transmit signals are mixed.

24. Apparatus in accordance with claim 23, wherein the second unit comprises a second mixer which mixes signals of the first mixer, after being filtered, with signals causing the frequency modulation.

25. Apparatus in accordance with claim 23, wherein the second unit comprises a phase detector which detects a phase difference between mixing signals and signals causing the modulation.

26. Apparatus in accordance with claim 21, wherein a mixing device is provided which mixes the receive signals and the evaluation transmit signals with intermediate frequency signals.

27. Apparatus in accordance with claim 21, wherein a mixing device is provided which mixes signals at an output frequency which is a difference between the base frequency ($f_0$) and an intermediate frequency ($f_i$) with intermediate frequency signals modulated at the modulation frequency ($f_m$), wherein the resulting mixing signals are the transmit signals, and which mixes the receive signals with the signals having the output frequency ($f_0-f_i$).

28. Apparatus in accordance with claim 21, wherein the microwave transmitting device transmits the transmit signals of a first base frequency ($f_0^1$) and a second base frequency ($f_0^2$), the first base frequency ($f_0^1$) being different from the second base frequency ($f_0^2$).

29. Apparatus in accordance with claim 21, wherein the piston cylinder is a hydraulic cylinder or a pneumatic cylinder.

30. Apparatus in accordance with claim 21, wherein an antenna is arranged in a first region of a cylinder space that has a smaller diameter than a second region within which the piston moves.

31. Apparatus in accordance with claim 30, wherein a side of the antenna facing towards the piston is set back relative to a transition between the first region and the second region.

32. Apparatus in accordance with claim 21, wherein an antenna is arranged in a cylinder space in such a manner that, together with a receiving space for the antenna, it is a continuation of a coaxial cable.

33. Apparatus in accordance with claim 21, wherein an antenna is arranged in an annular cylindrical subspace or a hollow cylindrical subspace of the piston cylinder.

* * * * *